Sept. 29, 1942. R. J. LIMBERT 2,297,309
METHOD OF MOLDING
Filed Dec. 29, 1939 2 Sheets-Sheet 1
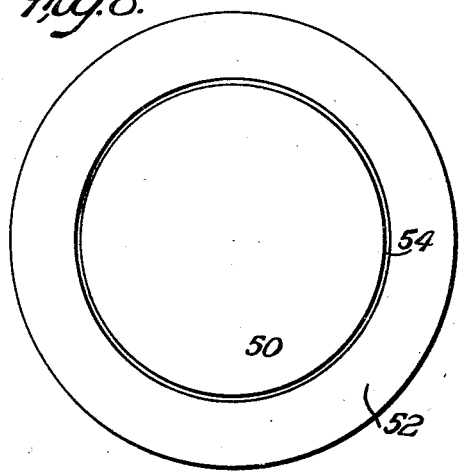
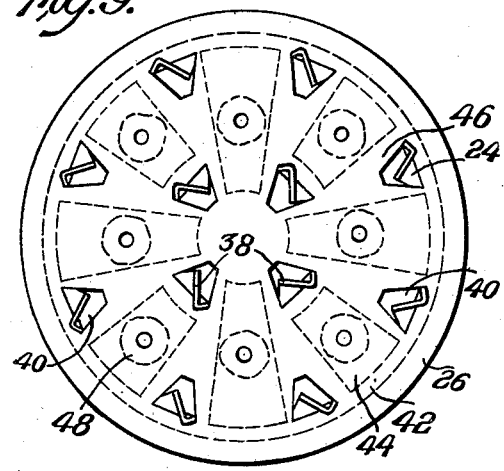
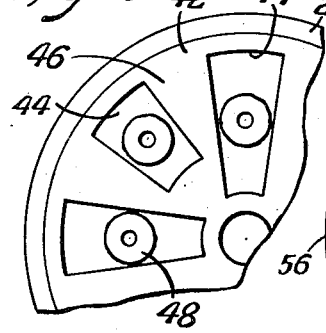
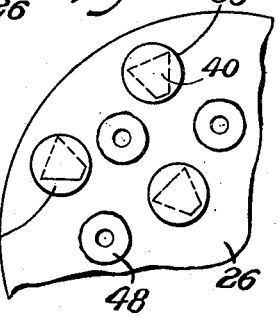
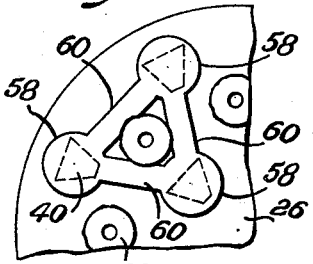
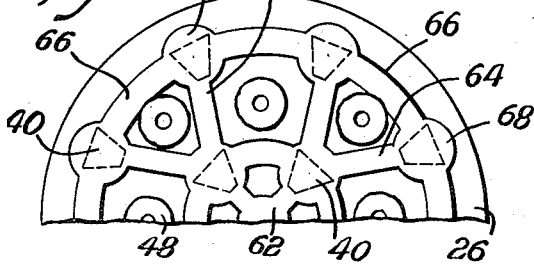
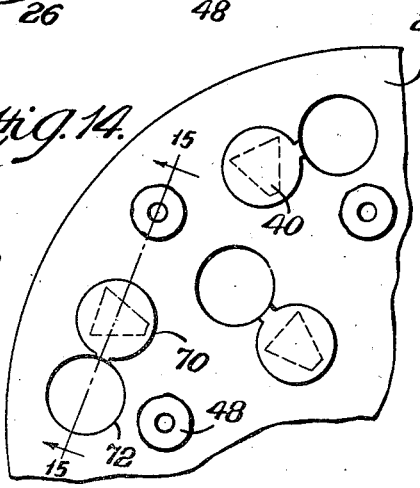
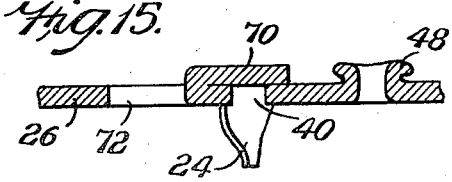
INVENTOR
ROLLIN J. LIMBERT
BY
ATTORNEY Sept. 29, 1942.  R. J. LIMBERT  2,297,309
METHOD OF MOLDING
Filed Dec. 29, 1939  2 Sheets-Sheet 2
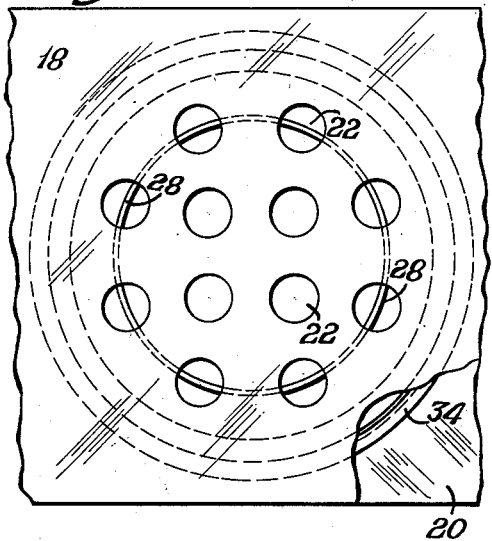
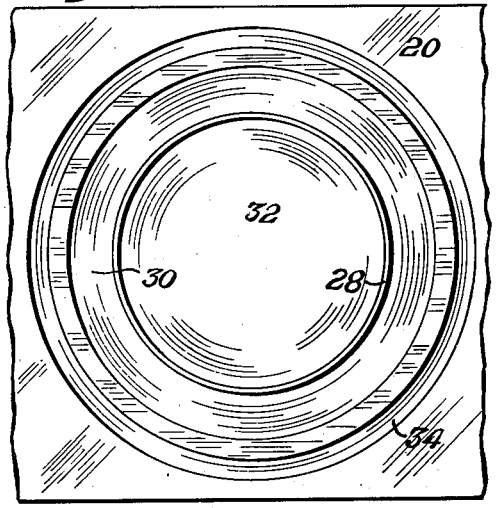
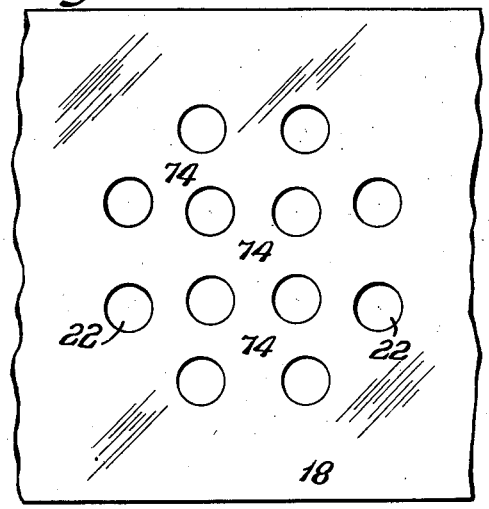
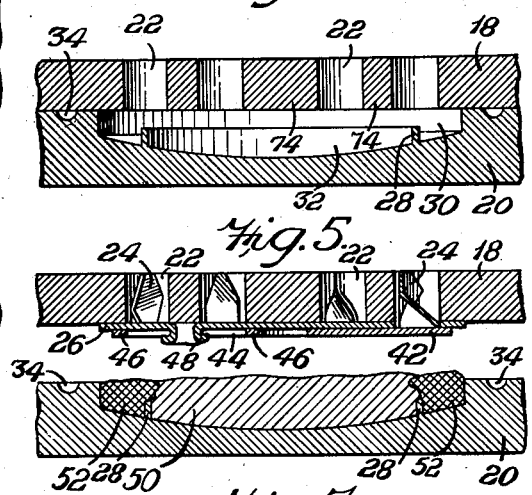
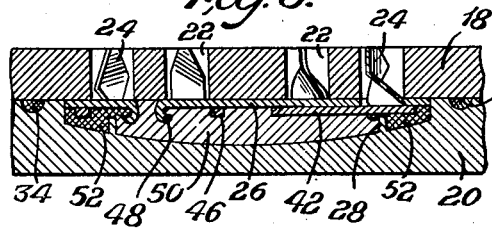
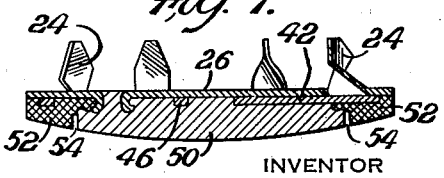
INVENTOR
ROLLIN J. LIMBERT
BY
ATTORNEY Patented Sept. 29, 1942

2,297,309

UNITED STATES PATENT OFFICE 2,297,309

METHOD OF MOLDING

Rollin J. Limbert, Conshohocken, Pa.

Application December 29, 1939, Serial No. 311,465

2 Claims. (Cl. 18—59)

My invention relates to a new and useful method of molding and more particularly it relates to the method of molding rubber, plastic and similar compositions in two or more color combinations, the sections of the finished molded product having different colors and being integrated and at the same time impregnated with their particular color throughout their entire thickness.

My invention still further relates to the method of molding, as an integral unit, materials of different colors while at the same time preserving a distinct separation of colors in the finished product as distinguished from molding processes in which materials of different colors are molded together in a merging or flowing manner.

It is desirable that road markers such as are disclosed in the Farrell Patent No. 2,166,669 be molded in two or more different color combinations to improve day and night visibility by the contrasting of such differently colored sections with themselves and with the road surface. Similarly, dart boards, which are at present of wood, and which have painted on their surface circles or radii of different colors to designate the various scoring areas, can preferably be molded of some plastic substance, such as rubber compound or other suitable material, the various sections of the dart board being initially molded of different colored materials so as to present the same distinguishing colorations regardless of surface wear which will attend the use of the article.

Certain molded articles must be provided with anchoring or fastening means or projections, such as the road marker of the Farrell patent above referred to, while other articles, such as a dart board, are preferably provided with smooth, uninterrupted surfaces on both sides thereof.

It is therefore another feature of my invention to provide a molding method and apparatus therefor which lends itself equally to the molding of articles having at least one irregular surface, such as the road marker referred to, as well as articles having both surfaces uniformly smooth whether they be convex, concave, or flat.

While I have, in stating the object of this invention, used a road marker having fastening prongs extending therefrom and a dart board having opposite, uniform, or uninterrupted faces as examples of the application of my invention and the construction of the apparatus for carrying out my invention, it is to be understood that my method and apparatus, as will be hereinafter seen from its structure as well as its operation, is adapted to the production of other articles though not herein specifically mentioned.

The full nature of my novel method and the construction of the apparatus therefor will be more clearly understood from the following specification and the accompanying drawings in which:

Fig. 1 represents a top plan view of one unit of a molding apparatus for carrying out my invention.

Fig. 2 represents a plan view similar to Fig. 1 with the upper half of the mold removed.

Fig. 3 represents a top plan view of the upper half of the mold viewed separately and away from the bottom half thereof.

Fig. 4 represents a vertical cross section of the mold shown in Fig. 1.

Fig. 5 represents a view similar to Fig. 4 showing the mold loaded and in the open position.

Fig. 6 represents a view showing the mold in closed or operative position.

Fig. 7 represents in vertical cross section a view of the road marker formed in the mold shown in Fig. 6.

Fig. 8 represents, on an enlarged scale, a top plan view of the molded road marker shown in Fig. 7.

Fig. 9 represents a bottom plan view of Fig. 8.

Fig. 10 represents a fragmentary top plan view of the road marker shown in Fig. 9 with the plastic facing omitted to show details of construction.

Figs. 11 to 15 inclusive represent different modified forms of construction which may be used in connection with the molding of the marker shown in Figs. 7 to 9.

Referring to the drawings in which like reference characters indicate like parts, and more particularly to Fig. 4, 18 designates the upper half of the mold and 20 designates the lower half thereof. The upper half 18 (when intended for use in molding the road marker of Figs. 7 to 9) is provided with openings 22 which, as will be seen in Figs. 5 and 6, accommodate the prongs 24 which project upwardly (during the molding operation) from the base plate 26 of the road marker. If the mold is intended to be used in connection with a dart board or any other object, the opposite faces or surfaces of which are uniform and uninterrupted by prongs, lugs, or the like, the upper half of the mold (as viewed in Fig. 4) would be solid throughout and there would be no openings 22. Similarly, if the mold is to be used for making an article, which, instead of prongs 24 is provided with knobs whether they be round or of any other desired shape, the upper half 18 of the mold will be provided with corresponding depressions along its lower face or the side thereof which would be brought into contact with the juxtaposed face of the lower half 20 of the mold. Since, with this explanation, any person skilled in the art can carry out the invention insofar as it relates to the upper half 18 of the mold, it is deemed unnecessary to illustrate the same by means of separate drawings.

With respect to the lower half 20 of the mold, it is pointed out that it is provided with a cavity of the desired size and contour, which cavity is divided by the partition 28 into the outer or peripheral portion 30 and the inner or central portion 32. It will also be noted that the partition 28 extends only part way through the depth of the cavity so that the cavity is continuous above the upper edge of the annular partition 28. In connection with the partition 28 I wish to point out that while I have only shown one such annular partition it is to be understood that this is only because, as illustrated, the invention is applied to the production of a two-colored effect, but that, where more than two colors are needed, three or more partitions 28 will be employed. Also, the partition 28 is shown as being annular in character in order to produce the road marker illustrated in Fig. 8 which has an outer annular portion of one color and a central circular portion of another color, and again I wish to point out that the partition 28 need not be annular but can be zigzag, rectangular, or any other desired rectilinear or geometric design, the shape and disposition of the partition 28 being designed for each specific case according to the appearance or the contour desired in the finished product. Since the number of partitions 28 that can be used will vary, and since the particular shape or contour of the one or more partitions 28 that may be used can also perhaps be infinitely varied, it is neither practical nor necessary to show specific illustrations of such variations since, again, with this explanation, those skilled in the art will be able to carry out the invention. The lower half 20 of the mold is also provided with the overflow pocket 34 which is destined to receive the excess of the material that would be squeezed out during the molding of any given product.

Assuming that my novel molding method is to be used in the manufacture of a road marker of the type disclosed in the Farrell patent above mentioned, except that this road marker is to be made of different colored sections, and referring now to Figs. 5 to 10, it will be seen that I utilize a base plate 26 from which are punched out the road-engaging prongs 24 thus leaving openings 40 in the base plate 26. When it is desired to mold a plastic such as rubber composition or the like, it will ooze out through the openings 40 and thus not only result in waste and in improper formation of the molded body of the marker itself, but also the composition adheres to the prongs 24 thus entailing considerable expense in cleaning the prongs 24 before shipment for use. In order to enable me to mold an object, such as the road marker illustrated, with efficiency and economy and at the same time to prevent the plastic composition from being extruded through the openings 40 into the prongs 24, I utilize an auxiliary plate 42 which may be solid throughout or which may be provided with openings or cut-outs 44 which are separated by the intermediate solid portions 46. The plate 42 is so superimposed upon the base plate 26 so as to bring the solid portions 46 thereof into registration with the openings 40 caused by the formation of the tongues 24 thus closing the openings as seen in Figs. 5, 6 and 7. In actual practice of making the road marker I preferably punch out of the base plate 26 a plurality of grummets 48 which are of the shape clearly seen in Figs. 5, 6 and 7 and around which the plastic material is adapted to be embedded during the molding operation thus firmly interlocking the plastic facing to the base plate 26 and the superimposed auxiliary plate 42. As will be best seen from Fig. 9, the grummets 48 are punched out of portions of the base plate 26 which register with the cut-outs or openings 44 in the auxiliary plate 42 thus making for greater depth consistent with the greatest thickness of wearing surface that is obtainable, since, if the grummets 48 were to be punched out through the auxiliary plate 42, either the grummets would have to be made somewhat longer, or the thickness of plastic wearing surface above the grummets would be reduced by the thickness of the auxiliary plate 42. With the base plate 26 and the auxiliary plate 42 assembled as shown in Fig. 9, they are placed against the undersurface of the upper half 18 of the mold with the prongs 24 seated in the recesses or various openings 22. The plastic from which the road marker or other object is to be made is then placed in the cavity formed in the lower half 20 of the mold, with the plastic forming the central white portion 50 placed in the central cavity 32, within the partition 28 and with the orange colored plastic 52 forming the peripheral portion of the marker placed in the cavity 30. Slightly more material 50 and 52 is put into the lower half of the mold than is actually needed to form the finished product and the upper half 18 and the lower half 20 are then pressed together as illustrated in Fig. 6. The excess plastic material is squeezed outwardly and is received in the overflow pocket 34. After the molding operation is completed and the finished product, such as the road marker illustrated, is removed, it appears as shown in Fig. 7 with the white and orange colored plastic materials merging together and thoroughly united or integrated at their junction with the base plate 26 and auxiliary plate 42, that is to say, through the depth of the space between the upper edge of the partition 28 and the juxtaposed face of the base plate 26 and auxiliary plate 42, while the portions of the plastics 50 and 52 throughout their remaining thickness will be separated by a slit 54 which is of a depth equal to the height of the partition 28 and which is preferably very narrow or as thin as it is practical to make the partition 28. In the molding of different articles such as a dart board (an article which does not have projections such as the prongs 24) the auxiliary plate 42 can be dispensed with since there will be no openings in the base plate 26 through which the plastic may ooze out during the molding operation. Also, while I have illustrated the structure and method of operation of a single mold, it is to be understood that a bank comprising multiple molds can be constructed for simultaneous operation. If it is desired to mold a road marker or the like from one kind or one color plastic, the partition 28 can be omitted and a unitary product will be produced.

In Fig. 11 I have shown different means for closing the openings 40 formed in the base plate 26 by the punching of the prongs 24, this means consisting of separate discs 56 which are suitably secured to the base plate 26 in a manner to close the openings 40.

In Fig. 12 I have shown a still further modification in which three discs 58 are interconnected by the arms 60 so that three such discs may be manipulated and secured simultaneously to the base plate 26 to reduce the time and labor which will be necessary in applying as many separate discs 56 as there are openings 40 in the base plate 36.

In Fig. 13 I have shown a still further modification in which a central hub 62 is connected by the arms 64 to an annular member 66 in which are formed the discs 68, the hub 62 serving to cover the central openings 40 that may be found in the base plate 26 while the discs 68 close the peripheral openings 40 in the base plate 26. In this construction the hub 62 and discs 68 for closing the openings 40 in the base plate 26 are integral somewhat along the lines of the auxiliary plate 42 illustrated in Fig. 10 and can be handled as a unit.

In Figs. 14 and 15 I have shown a still further modification in which I dispense with any form of auxiliary plate, and in which I punch out of the base plate 26 discs 70 which are deflected upon themselves, as shown in Fig. 15, and brought over to close the openings 40 formed by the punching out of the prongs 24. In this construction the openings 72 left by the formation and deflection of the discs 70 need not be closed since they will be in registration with the solid portions 74 of the upper half 18 of the mold which intervene between the openings 22 so that no plastic can ooze through the openings 72. The solid portions 74 of the upper half 18 of the mold also register with and close the openings formed in the base plate 26 by punching out of the grommets 48 as best seen in Fig. 5.

Having thus described my invention, what I claim as new and desire to secure by Letters Patent is:

1. The method of making a road marker having a rigid base and a resilient plastic facing which consists in punching prongs out of said base and deflecting them at an angle to one face thereof, placing a closure over the openings left by the punching out of said prongs, placing said base and closure against a mold section having openings therein for accommodating said prongs, placing the material for forming said resilient facing in another mold section, and applying said base and said first mentioned mold section under pressure onto said plastic material and the mold section containing the same.

2. The method of molding a plastic material onto a base having apertures therein, and prongs projecting from one face thereof which consists in placing a closure over said apertures, associating said base with a mold section having recesses therein for accommodating said prongs, placing the plastic material in another mold section, and pressing said mold sections together.

ROLLIN J. LIMBERT.